H. K. WHEELOCK.
VULCANIZER.
APPLICATION FILED NOV. 30, 1917.
1,340,641.
Patented May 18, 1920.
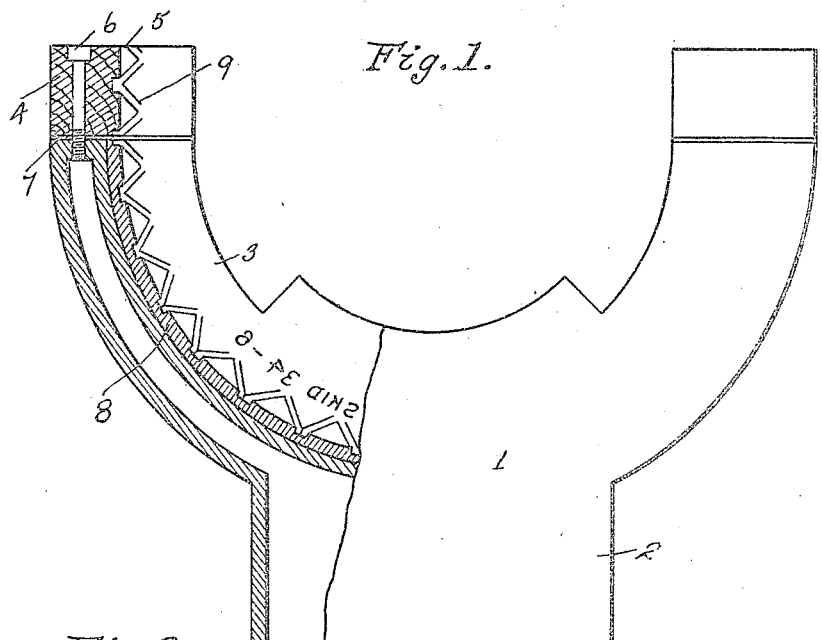
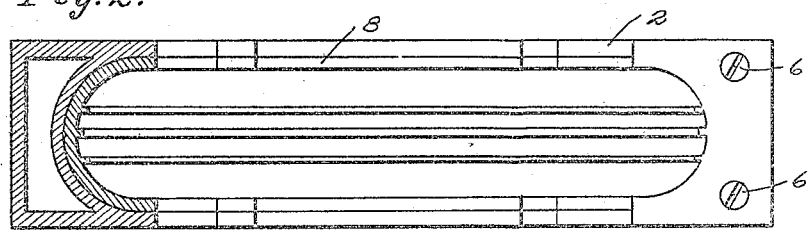
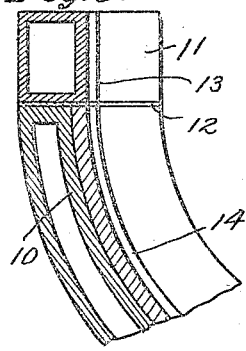
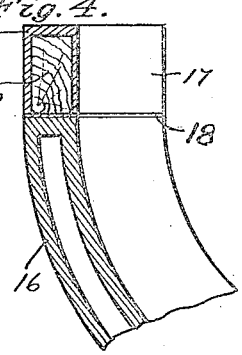
Witnesses,
Inventor,
Herbert K. Wheelock,
By
His Attorney.

UNITED STATES PATENT OFFICE.

HERBERT K. WHEELOCK, OF LOS ANGELES, CALIFORNIA, ASSIGNOR, BY MESNE ASSIGNMENTS, TO WESTERN VULCANIZER MANUFACTURING COMPANY, OF CHICAGO, ILLINOIS, A COPARTNERSHIP CONSISTING OF HERBERT K. WHEELOCK, WALTER R. FONTAINE, AND FRANK A. WELLER.

VULCANIZER.

1,340,641.      Specification of Letters Patent.      Patented May 18, 1920.

Application filed November 30, 1917. Serial No. 204,653.

*To all whom it may concern:*

Be it known that I, HERBERT K. WHEELOCK, a citizen of the United States, residing at Hollywood, Los Angeles, in the county of Los Angeles and State of California, have invented new and useful Improvements in Vulcanizers, of which the following is a specification.

This invention relates to improvements in vulcanizers of the type designed for use in repairing pneumatic tires, and resides in the provision of apparatus of this character which is constructed and arranged so as to prevent the formation of mold marks or other objectionable irregularities at points on the tire where the ends of the vulcanizer engage with the tire.

I am aware of certain vulcanizers in which means is provided to avoid the formation of objectionable marks upon the tire such as above outlined, but in the majority of vulcanizers the curing of a tire in the repairing or retreading thereof takes place up to the extreme ends of the mold, and inasmuch as the tires are usually firmly clamped in the mold, the sharp edges of the mold form depressions or mold marks and render the finished tire unsightly in appearance, giving it an unmistakable second-hand appearance. I aim to overcome the above noted objections, and in carrying out my invention I provide separate end portions for my mold, said end portions being of such material and so constructed that little or no heat from the mold is transmitted thereto and no vulcanizing or curing action is therefore had with relation to the tire about those portions thereof which are engaged with said end portions.

A further object of the invention is to provide a vulcanizer having a removable matrix and provided with removable end portions alining with the matrix and having facial formations corresponding to those of the matrix so that a tire may be securely and evenly positioned within the mold of the vulcanizer and be smoothly and neatly molded by said matrix throughout the entire portion thereof which is subjected to the molding action, this being accomplished by providing the non-vulcanizing portions with faces or configurations corresponding to those of the matrix.

The invention further consists in the particular combination, construction, association and mode of operation of the various parts and elements of the apparatus such as described in the following specification, illustrated in the accompanying drawing and finally pointed out in the appended claims.

In the drawing:

Figure 1 is a side elevation and partial vertical longitudinal section of the vulcanizing mold constructed in accordance with my invention showing a matrix within the mold, and the end portions of the mold having faces of a formation corresponding to that of the matrix, the matrix being adapted to form a zigzag tread;

Fig. 2 is a top plan view of the apparatus shown in Fig. 1 showing one end of the mold broken away and in section, the matrix being of a different form as compared to that of the matrix shown in Fig. 1;

Fig. 3 is a fragmentary vertical sectional view of a modified form of the invention in which the end portions of the mold are in the form of hollow blocks;

Fig. 4 is a fragmentary sectional view of another modified form of the invention; and Fig. 5 is a fragmentary sectional view of still another modified form of the invention.

Referring particularly to the drawing, 1 designates as an entirety a hollow vulcanizing mold of arcuate formation having the customary central tank portion 2 for supplying steam, which, as is well known performs the vulcanizing or curing action. This mold is provided with the usual arcuate tire receiving groove 3 and is otherwise constructed in accordance with the general practice followed out in the manufacture of vulcanizers. In carrying out my invention the end portions of this mold 1 are sectional and preferably consist of non-metallic blocks 4 formed with a tire receiving groove 5 which is adapted to register with the groove 3. These blocks 4 are preferably removably secured to the ends of the mold by bolts 6 having their heads countersunk in the upper ends of the blocks.

I may interpose between the blocks and ends of the molds insulation sheets 7 which may be formed of asbestos or some other heat insulating material. These sheets 7 provide a further means for retarding the transmission of heat from the mold to the blocks 4 thus preventing the vulcanizing of the tire where it contacts with the blocks and also assisting to prevent the formation of objectionable mold marks between the mold and the end blocks.

In certain classes of repair work it is necessary to mold the repaired portion of the tire, with special configurations. In this event a matrix 8 is mounted within the mold throughout the entire length thereof and the face of this matrix is flush with the tire engaging faces of the blocks 4. This matrix 8 is removably disposed within the mold and the faces of the blocks 4 are formed with configurations 9 which correspond to those of the matrix 8.

In repairing or vulcanizing a new section of a tire with the apparatus hereinbefore described and illustrated in the drawing the tire is positioned in the ordinary manner within the mold and during the vulcanizing the matrix 8 will mold the new portion of the tread of the tire so as to correspond in appearance with the remaining portion thereof already vulcanized. While the tire is being cured the tread thereof will engage in the configurations 9 of the blocks 4 and it will be seen that the tire will be uniformly molded as to its tread formation and will have the appearance more or less of a new tire rather than show mold marks such as would result from the use of the ordinary apparatus which would give the unmistakable appearance of a second-hand or repaired tire. The blocks 4 preferably are constructed of wood, but may be otherwise formed of some suitable material which is not subject to the ready retention and transmission of heat. Whatever pressure is brought upon the tire so as to cause the upper edges of the blocks to embed themselves into the rubber will not result, as is the case with the ordinary vulcanizer mold, in the formation of a depression or mold mark in the finished tire, since in the vulcanizer of my invention the blocks themselves prevent the vulcanization of these portions of the tire, and any mark formed by the upper edge of an end block is eliminated when the tire is moved around in the mold for vulcanization of the next section in the retreading operation.

It will be seen that I may readily remove the matrix and coöperating end blocks and replace them with a matrix and blocks having a different design.

Referring particularly to Fig. 3 of the drawing, 10 designates as an entirety a vulcanizer mold of the same general formation and construction as that shown in Fig. 1 of the drawing, and 11 designates the end blocks or portions of the mold. In this form of the invention the end blocks instead of being solid as shown in Fig. 1 are hollow and may be constructed of metal. These end blocks have interposed therebetween preferably, a sheet of insulating material 12 such as asbestos, and the tire engaging faces of this type of block may have mold configurations 13 thereon so as to correspond with the configurations of the matrix 14 within the mold. However, in this form the tire engaging faces of the block may be smooth and likewise the mold is smooth when no matrix is used. This block 11 is removably held in place by bolts.

With reference to Fig. 4 wherein I have illustrated another modified form of the invention, 16 designates a mold and 17 a modified form of end block. This block is removably secured to the mold and may have the asbestos sheet 18 interposed between itself and the mold if so desired. In this form of block the body thereof is of nonmetallic material 19 such as wood, and incased in a metal casing 20. This casing 20 is preferably made in the form of a casting having its lower side open but may be otherwise constructed if so desired. The open side of the casing is that opposed to the end of the mold. In this form the transmission of heat from the mold is materially retarded by the asbestos sheet 18 and the selection of materials.

Referring particularly to Fig. 5 wherein there is shown another modified form of the invention, 21 designates the mold, 22 a matrix within the mold, and 23 an end block which is hollow and preferably formed of metal. This block is also removably secured to the mold and is provided with a cooling fluid inlet 24, and a cooling fluid outlet 25, being in the sense a fluid cooling mold end. I preferably use water in cooling this block but other fluids may be effectively used if so desired.

With reference to the foregoing description and accompanying drawing, it will be seen that I have provided an improved vulcanizer of a simple and inexpensive construction and which will permit of the repair of pneumatic tires, in a neat, expeditious and reliable manner.

The foregoing description and accompanying drawing relate to the preferred embodiments of the invention, and it is to be understood that various minor changes in details of construction, and as to the size, shape and proportions of parts of the machine, may be resorted to when required, without departing from the true spirit and scope of the invention as defined.

In this application I claim my invention broadly as illustrated in all of the figures of the drawing, and also the specific embodiments thereof illustrated in Figs. 3 and 5. In my divisional application Serial No.

359,085 filed February 16, 1920 I have claimed the specific embodiments illustrated in Figs. 1, 2 and 4 of the present application.

Having thus disclosed my invention, I claim and desire to secure by Letters Patent:

1. A vulcanizer comprising a mold having a tire-receiving groove therein, removable end portions for said mold having tire-receiving grooves therein, and a matrix mounted within the groove of the mold and having its tire-engaging face flush with the tire-engaging faces of the end portions, said end portions having their tire-engaging faces formed to correspond in configuration to that of the matrix.

2. A vulcanizer comprising a mold having an arcuate tire-receiving groove provided with end portions constructed to retard the transmission of heat to a tire mounted within the groove, and a matrix mounted within the groove, said end portions having tire-engaging faces flush with the tire-engaging face of the matrix and of a formation corresponding to that of the matrix.

3. A vulcanizer comprising a mold having an arcuate tire-receiving groove in its upper face, a matrix removably mounted within the groove and formed with facial configurations, and extensions secured to the ends of the mold and having tire-receiving grooves alining with the tire-receiving groove in the mold and provided with facial configurations conforming to those of the matrix.

4. A vulcanizer comprising a mold having an arcuate tire-receiving groove in its upper face, a matrix removably mounted within the groove and formed with facial configurations, and extensions secured to the ends of the mold and having tire-receiving grooves alining with the tire-receiving groove in the mold and provided with facial configurations conforming to those of the matrix and heat insulating material interposed between the ends of the mold and extensions.

5. A vulcanizer comprising a mold having a tire-receiving groove therein, hollow extensions carried at the ends of the mold and having tire-receiving grooves therein registering with the tire-receiving groove of the mold, and a matrix mounted within the tire-receiving groove of the mold and being flush upon its outer face with the tire-receiving faces of the blocks, the tire-receiving grooves in said blocks having facial configurations corresponding to those of the matrix.

6. A vulcanizer comprising a mold formed with a tire receiving groove, a matrix fitted removably within the groove, and a non-curing end portion carried by the mold and having a tire engaging face which forms a continuation of the working face of the matrix.

7. A vulcanizer comprising a mold formed with a tire receiving groove, a matrix fitted removably within the said groove, and an end portion carried by the mold and overhanging the end of the matrix, the overhanging portion of the end portion being formed with a tire engaging face which is a continuation of the working face of the matrix.

8. In a tire vulcanizer, the combination with a mold having a tire-receiving groove therein, of a matrix having its tire-engaging surface conforming to the configuration of the surface of the tire to be repaired, and means for removably supporting said matrix in the tire-receiving groove of the mold, whereby a matrix having a surface conforming to that of the particular tire to be repaired may be inserted in the mold.

9. In a vulcanizer, the combination with a mold having a tire-receiving groove therein, of members secured to the ends of said mold to retard heat transmission from the mold to the tire, said members having tire-receiving grooves forming continuations of the tire-receiving groove of said mold, and heat insulating material interposed between the ends of the mold and the adjacent surfaces of the adjoining end members.

10. In a tire vulcanizer, the combination with a mold having a tire-receiving groove therein, of members secured to the ends of said mold to retard heat transmission from the mold to the tire, said members having tire-receiving grooves forming continuations of the tire receiving groove of the mold and having tire-engaging surfaces conforming in contour to the tire-engaging surface of said mold.

In testimony whereof I have signed my name to this specification in the presence of two subscribing witnesses.

HERBERT K. WHEELOCK.

Witnesses:
L. A. ARNOLD,
CHAS. J. CHEW.